Oct. 26, 1948.　　　　R. R. TEETOR　　　　2,452,503
PISTON RING
Filed June 21, 1944
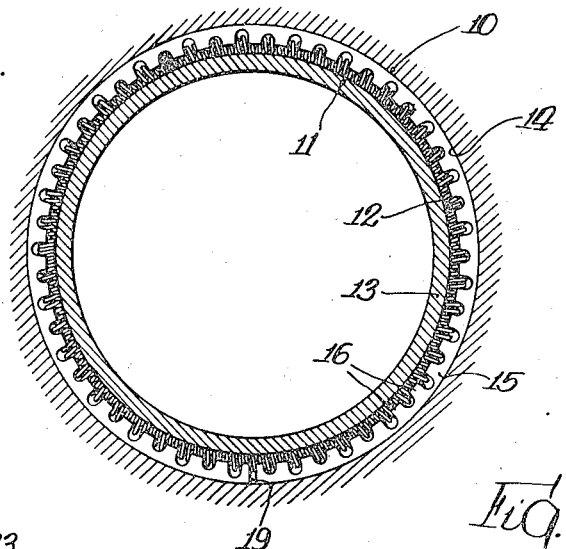
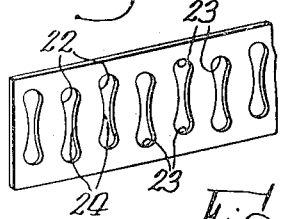
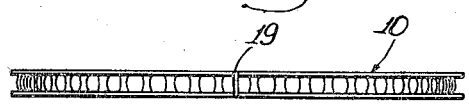
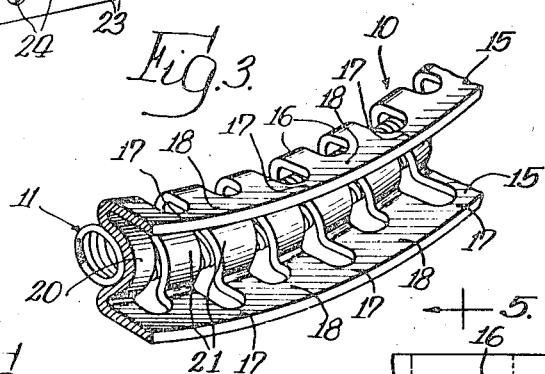
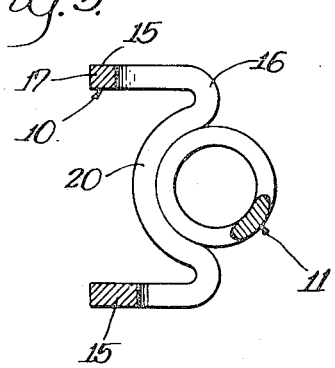
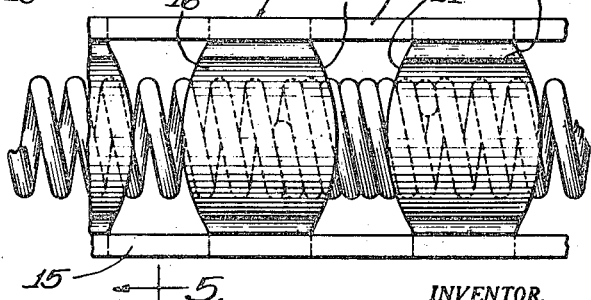
INVENTOR.
Ralph R. Teetor,
BY
Davis, Lindsey, Smith & Shonts
Attys.

Patented Oct. 26, 1948

2,452,503

UNITED STATES PATENT OFFICE 2,452,503

PISTON RING

Ralph R. Teetor, Hagerstown, Ind., assignor to The Perfect Circle Company, Hagerstown, Ind., a corporation of Indiana Application June 21, 1944, Serial No. 541,334

8 Claims. (Cl. 309—45)

1

The invention relates to piston rings for use in cylinders such as are provided in internal combustion engines, and the general object of the invention is to provide a novel piston ring which effectively prevents passage of excessive oil from the crankcase into the combustion space, which readily adapts itself to a cylinder that is tapered or out-of-round, and which functions in the desired manner independently of the depth of the ring groove in the piston.

Another object is to provide a novel piston ring formed of thin metal and having relatively short, substantially independent portions with unbroken cylinder-contacting edges, which are readily conformable to substantially any cylinder no matter to what extent it varies from a true cylindrical form nor what the character of the variation is.

A further object is to provide a piston ring of highly flexible character and having spring means carried solely by the ring to effect radial expansion of the ring and thus utilize the flexibility of the ring to obtain close adherence of the ring to the cylinder wall.

Other objects and advantages will become apparent from the following description taken in connection with the accompanying drawings, in which:

Figure 1 is a transverse sectional view through a cylinder and piston provided with a piston ring embodying the features of the invention.

Fig. 2 is an edge view of the piston ring.

Fig. 3 is a fragmentary perspective view on an enlarged scale of the piston ring.

Fig. 4 is a fragmentary edge view on a still larger scale.

Fig. 5 is a sectional view taken on the line 5—5 of Fig. 4.

Fig. 6 is a view showing one of the steps in the manufacture of the ring.

The present invention provides a ring of great flexibility, so that the ring can readily conform to variations of any character in the cylinder, a spring being carried by the ring to cause the ring to conform to the desired degree to such variations. The ring structure comprises a pair of flanges each formed of a large number of relatively small arcuate portions flexibly connected to one another to permit each individual portion to substantially conform to the adjacent portion of the cylinder, but so connected to each other as to provide an unbroken edge. The expansive force of the spring means thus may be exerted where the divergence from the true cylindrical shape of the cylinder is the greatest, and the

2 desired contact with the cylinder through the entire face of the ring is thereby obtained.

The spring means is carried entirely by the ring and does not engage the bottom of the ring groove in the piston. Thus my spring means is not dependent upon the depth of the ring groove in the piston to permit it to exert the desired expansive force on the ring, and the ring is caused to readily conform to the shape of the cylinder, regardless of the relation between the groove and the cylinder. Moreover, the highly flexible character of ring permits utilization of the expansive force of the spring means to the greatest degree.

As shown in Figs. 1, 3, 4, and 5 of the drawings, the complete piston ring comprises a ring member, indicated generally at 10, and a coiled spring 11. The ring member and spring, when assembled, are adapted to be placed in a ring groove 12 of a piston 13, to contact with the adjacent cylinder wall 14 with the ends of the ring member spaced apart to provide a gap 19. The groove 12 in the piston is of usual form, that is, rectangular in cross section, and is provided with the usual oil drain holes (not shown) to convey oil collected by the piston ring from the cylinder wall to the interior of the piston and thence back to the crankcase.

In its preferred embodiment, the ring member 10 comprises a pair of axially spaced cylinder-engaging flanges 15 connected at their inner edges by circumferentially spaced web members 16. The ring member, however, is fabricated from sheet metal, such as steel or other suitable material, so that the flanges 15 are relatively thin and are spaced a substantial distance apart. Since the web members 16 are located at the inner edge of the flanges, the faces of these flanges are adapted to engage the cylinder wall to prevent excessive passage of oil.

The ring member 10 is of highly flexible character due to the sheet metal construction and further because of the fact that the spaces between the web members 16 are so positioned as to define arcuate portions in the flanges 15 which are flexible relative to each other. Specifically, the construction providing the arcuate portions in the flanges 15 is obtained by extending alternate spaces between the web members 16 close to the face of the flanges to leave relatively narrow connecting portions, here indicated at 17, to define the arcuate portions, indicated at 18 in Fig. 3. Thus, while the portions 18 of each flange are integrally connected at their cylinder contacting edges or faces, the relatively narrow portions 17 permit flexing movement of each portion 18 relative to the adjoining portions. Preferably, the alternate spaces between the web members 16, which extend close to the face of the flanges to provide the narrow connecting portions 17, are so dimensioned that the connecting portions 17 have a radial dimension substantially equal to the thickness of the metal. Thus, while the portions 18 are relatively flexible, the flanges have cylinder-engaging edges which are unbroken except for the gap 19 between the ends of the ring.

The unbroken edges of the flanges therefore distribute any oil passing by the ring in the form of a thin film on the cylinder wall, rather than in streaks as would happen to some extent if any gaps between the respective arcuate portions occurred by reason of their being separated.

In order that the ring as a whole may conform in the greatest degree to the shape of the cylinder, the portions 18 of the respective flanges 15 are in staggered relation. Thus, the connecting portions 17 in one flange are staggered as to the connecting portions 17 in the other flange. Such relationship may be readily attained by providing openings between the respective web members 16, which are all of the same dimensions, but alternate openings are shifted transversely to provide the narrow connecting portions 17 in one flange while the other openings are so positioned as to provide the narrow connecting portions 17 in the other flange. This will become apparent when the manner of making the ring is hereinafter referred to.

It will be noted that the openings between the web members 16 extend not only in the connecting portion between the flanges but also into the plane of the flanges. Thus, with the flanges axially spaced, the oil collected by the ring during its reciprocation within the cylinder readily passes through both the axial and radial portions of these openings for return to the crankcase through the oil drain holes in the piston wall provided for this purpose.

The ring member 10 is highly flexible. The spring 11 is of the coiled type having its ends intertwined, as shown in Fig. 4, to form a closed annulus and is of sufficient length so that it will be placed under circumferential compression when the ring is positioned within the cylinder, and tends constantly to expand to its unconfined diameter. Thus the spring exerts an outward pressure on the web members 16 on which the spring seats, regardless of the size of gap 19 in the ring, to hold the edges of the flanges in engagement with the cylinder wall.

In order to provide a suitable seat for the spring, the web members 16 are shaped to assist in retaining the spring within the ring and to permit it to freely shift relative to the web members in expanding and compressing. To this end, each web member 16 is outwardly bowed as at 20 (see Figs. 3 and 5) to provide a substantially semicircular inwardly opening groove in which the spring is seated. Since the wire of which the spring is formed is smaller in diameter than the spacing between the web members 16, the latter are so shaped in the bottom or seating portion of the groove as to prevent the turns of the spring from catching against the edges of the web members when shifting. For this purpose, the web members are widened, as at 21, in their intemediate portion. In forming the ring, such widened portions 21 extend substantially tangential to the curvature of the spring and thus prevent the turns of the spring from catching on the edges thereof.

One of the features of the invention is the fact that the ring may be readily manufactured by inexpensive manufacturing processes with a minimum waste of metal. To make the ring I start with an elongated strip, shown in Fig. 6, of a width sufficient to provide both the flanges 15 and the connecting web members 16, the strip being of the desired thickness. In the first operation upon the strip, a series of apertures 22 are punched therein. The apertures 22 are all of substantially the same shape and dimension but are alternately offset toward one edge and the other of the strip. In this manner the reduced connecting portions 17 in the flanges 15 are provided at alternate spaces between the web members 16, with the connecting portions 17 in one flange staggered as to such portions in the other flange. The apertures 22 are preferably of hourglass form, that is, rounded at their ends, as indicated at 23, to prevent undue fracture of the metal in use, and reduced in width at their intermediate portions, as indicated at 24, to provide the widened portions 21 of the web members.

I claim:

1. A piston ring comprising a pair of axially spaced flanges, web members extending radially inward from said flanges and having axially extending portions to integrally connect said flanges and outwardly bowed to provide a wide channel, said web members being circumferentially spaced to provide both axial and radial openings therebetween, and a coiled spring seated in and against on the outwardly bowed portions of said web members.

2. A piston ring comprising a pair of axially spaced flanges, circumferentially spaced web members connecting said flanges, and a coiled spring seated on said web members, said web members being tangential to the spring and of sufficient width intermediate their ends so that their edges lie outside of the curvature of the spring to prevent the turns of the spring from catching on the edges of the web members.

3. A piston ring comprising a pair of axially spaced flanges, circumferentially spaced web members connecting said flanges and outwardly bowed to form an inwardly opening groove, and a coiled spring seated in said groove, said web members being sufficiently wide in their spring contacting positions to provide a smoth seat for the spring permitting it to shift freely in the groove without catching on the web members.

4. A piston ring comprising a pair of axially spaced flanges comprising arcuate portions each capable of flexing relative to adjoining portions, with the arcuate portions of one flange in staggered relation to the arcuate portions of the other flange, each arcuate portion having outwardly bowed web members integrally connecting said arcuate portion with two arcuate portions of the opposite flange, and a coiled spring bearing against and carried by the outwardly bowed portions of said web members for exerting radial pressure on the flanges.

5. A piston ring comprising a pair of axially spaced flanges, circumferentially spaced web members connecting said flanges, certain of the spaces between the web members extending close to the faces of the flanges to form arcuate portions in the flanges, with the cylinder contacting faces of the flanges flexibly connected together unbroken except at the gap in the ring, and spring means bearing against said web members.

6. A piston ring comprising a pair of axially spaced flanges, circumferentially spaced web members connecting said flanges, the spaces between the web members being substantially equal in dimension but alternately shifted to position alternate spaces close to the face of each flange in staggered relation in the respective flanges, said spaces thereby forming relatively flexible arcuate portions in the flanges with the cylinder contacting faces of the flanges unbroken except at the gap in the ring.

7. A piston ring formed of sheet metal and comprising a pair of axially spaced flanges, circumferentially spaced web members integrally connecting said flanges, certain of the spaces between the webs extending close to the cylinder contacting faces of the flanges to leave narrowed portions having a cross section of a radial dimension substantially equal to the thickness of metal of the flange, said extended spaces thereby forming arcuate portions in the flanges flexibly connected by said narrowed portions, with the cylinder contacting faces of the flanges unbroken except at the gap in the ring.

8. A piston ring comprising a pair of axially spaced flanges integrally connected by spaced web members, certain of the spaces between the web members extending close to the faces of the flanges to form arcuate portions in the flanges and integral and flexible portions at the faces of the flange and flexibly connecting the arcuate portions together.

RALPH R. TEETOR.

REFERENCES CITED

The following references are of record in the file of this patent:

UNITED STATES PATENTS

| Number | Name | Date |
| --- | --- | --- |
| 1,767,711 | Solenberger | June 24, 1930 |
| 2,224,338 | Bowers | Dec. 10, 1940 |
| 2,239,376 | Smith | Apr. 22, 1941 |
| 2,273,691 | Bowers | Feb. 17, 1942 |
| 2,290,499 | Smith | July 21, 1942 |
| 2,346,204 | Bowers | Apr. 11, 1944 |
| 2,346,896 | Bowers | Apr. 18, 1944 |

Certificate of Correction

Patent No. 2,452,503.  October 26, 1948.

RALPH R. TEETOR

It is hereby certified that errors appear in the above numbered patent requiring correction as follows:

In the grant, lines 2 and 13, and in the heading to the printed specification, line 4, name of assignee, for "The Perfect Circle Company" read *Perfect Circle Corporation*; column 4, line 73, claim 5, strike out the words "flexibly connected together" and insert the same after "flanges" and before the comma in line 72, same claim; column 5, line 8, claim 6, strike out "relatively flexible"; line 9, same claim, after "flanges" insert *flexibly connected together*;

and that the said Letters Patent should be read with these corrections therein that the same may conform to the record of the case in the Patent Office.

Signed and sealed this 15th day of February, A. D. 1949.

[SEAL]

THOMAS F. MURPHY,
*Assistant Commissioner of Patents.*